Oct. 21, 1952     E. FEINE     2,614,262
ARTIFICIAL LEG
Filed Oct. 24, 1950
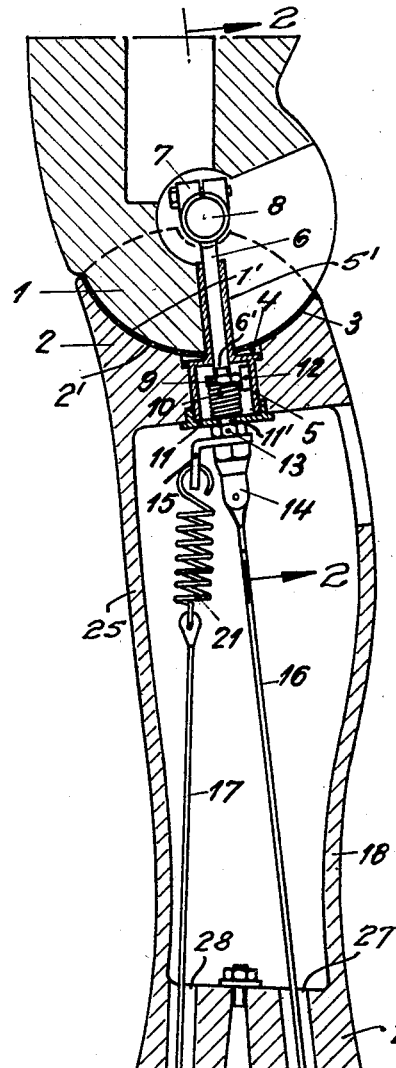
Fig. 1
Fig. 2
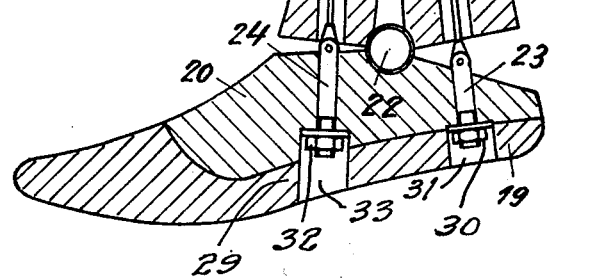
Inventor:
Erich Feine
By Patented Oct. 21, 1952

2,614,262

UNITED STATES PATENT OFFICE 2,614,262

ARTIFICIAL LEG

Erich Feine, Ravensburg, Germany

Application October 24, 1950, Serial No. 191,824
In Germany October 29, 1949

20 Claims. (Cl. 3—2)

The present invention relates to an artificial leg, and more particularly to an artificial leg for thigh amputees.

It is known in the art to provide artificial legs of the kind described with a braking device for the knee-joint.

It is an object of the present invention to provide an artificial leg of the kind described with two braking actions on the knee-joint which are adjustable independently of each other.

It is another object of the present invention to provide a knee-joint with two braking actions, one braking action being exerted in the swinging phase of the artificial leg and the other one in the supporting phase of the artificial leg.

It is a further object of the present invention to provide a device by which the proportion of the magnitude of the braking actions can be changed.

It is a still further object of the present invention to provide an artificial leg of the kind described which allows a movement of the knee-joint in the sense of a flexion and an extension but no lateral movement in the sense of an inversion and an eversion.

An artificial leg according to the present invention comprises in combination, an element having an at least partly spherical surface, a socket having a surface cooperating with said spherical surface of said element, said element and said socket forming a knee-joint of the artificial leg, a pivot arranged substantially in a horizontal diameter of said spherical surface of said element; a sleeve arranged radially to said spherical surface in a boring of said socket; a bottom plate forming part of said sleeve and having an aperture, a rod connected with one end thereof to said pivot and extending through said sleeve and beyond the aperture of said bottom plate; a screw nut arranged on said rod and abutting against the lower surface of said bottom plate whereby by tightening said screw nut said pivot and said socket can be approached to each other and the friction between said element and said socket can be adjusted; a lever brake for said knee-joint, said lever brake being connected to said rod and having a stronger effect on said rod than the tightening effect of said screw nut on said rod; and means for actuating said lever brake when the artificial leg is loaded in the supporting phase by the weight of the amputee.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevation of an artificial leg according to the present invention; and Fig. 2 is a cross-section of a part of Fig. 1 taken along the line II—II.

Referring now to the drawings the knee-joint of the artificial leg comprises an element 1 having an at least partly spherical surface 1' and a socket 2 having a surface 2' arranged for cooperation with the spherical surface 1' of the substantially ball-shaped element 1. The socket 2 is provided on the surface 2' with a suitable lining 3 which may consist of chrome leather or the like. The ball-shaped element 1 consists preferably of wood impregnated with wax, paraffin wax, or the like.

The socket 2 is provided with a boring 4 which runs substantially in the direction from the knee-joint to the heel of the artificial leg. A sleeve 5 is accommodated in the boring 4 and is provided with a restricted part 5' for the guiding of a rod 6. The sleeve 5 may consist of steel or the like. The rod 6 is adjustable by means to be described more in detail hereinafter and resiliently supported by the sleeve 5 as will become clearer from the following description.

The upper end of the rod 6 is designed as a clamping eye 7 by which it is connected to a pivot 8 forming the axis of the knee-joint and arranged substantially in a horizontal diameter of the spherical surface 1' of the element 1 the center of which is hollow in order to accommodate the pivot 8 and the clamping eye 7. The lower end of the rod 6 is threaded, the upper end of the thread being shown in Fig. 1 at 6'. Inside the sleeve 5 the rod 6 carries a screw nut 9 (termed hereinafter the second screw nut) and is surrounded underneath the screw nut 9 by resilient means, such as a compression spring 10 abutting against the bottom plate 11 of the sleeve 5 which is provided with an aperture 11' for the passage of the lower end of the rod 6. The sleeve 5 is provided with a projection or stop member 12 on the inner face thereof which extends into the path of the corners of the polygonal perimeter of the screw nut 9. By this it is accomplished that the screw nut 9 cannot be turned for more than an angle included by two consecutive corners. Actually the angle through which the screw nut 9 can be turned is much less than this angle since the stop member 12 reaches preferably as far as the central portion of a side of the screw nut 9.

The rod 6 carries a screw nut 13 (termed hereafter the first screw nut) which abuts against the lower surface of the bottom plate 11. If the screw nut 13 is tightened the compression spring 10 is further compressed and the pivot 8 and the element 1 approach the lining 3 of the socket 2 thereby increasing the friction between the element 1 and the socket 2. The compression spring 10 tends to lift the element 1 from the lining 3 of the socket 2. Thus it will be seen that by a tightening of the screw nut 13 a friction between the element 1 and the lining 3 of the socket 2 is established which has a braking effect during the swinging phase of the leg at which the foot piece to be described in more detail hereinafter is not supported by the ground.

The element 1 and the socket 2 have conically shaped side surfaces 1'' and 2'', respectively (Fig. 2), which are connected with each other by means of the lining 3 and allow only a movement of the artificial leg in the sense of a flexion and an extension, but no movement in the sense of an inversion or an eversion.

The lower end of the rod 6 carries a first connecting piece 14 which is connected to a first preferably flexible member 16 connected in turn to a first threaded bolt 23. Furthermore the rod 6 carries a second connecting piece 15 preferably having the shape of an angle iron the legs of which are provided with holes through one of which passes the rod 6, the angle iron 15 being held in position between the screw nut 13 and the first connecting piece 14. A resilient part such as a tension spring 21 is connected with one end thereof to the hole of the other leg of the angle iron 15 and with the other end thereof to a second, preferably flexible member 17 which ends in a second threaded bolt 24. The parts arranged below the bottom plate 11 of the sleeve 5 described so far are arranged within a hollow extension 25 of the socket 2 which has outwardly the shape of a calf of the artificial leg and is provided in its lower part 26 with two borings 27 and 28 for accommodating the lower ends of the first and second rod-shaped flexible members 16 and 17. The lower end 26 of the extension 25 is provided with a pivot 22 forming an ankle joint of the artificial leg to which is connected an artificial foot 20 comprising a heel portion 19 and a front portion 29 arranged at opposite sides of the pivot 22. The first bolt 23 is provided with a tightening nut 30 arranged in the hole 31 of the heel portion 19, whereas the second bolt 24 carries a tightening nut 32 arranged in the hole 33 of the front portion 29 and the main portion of the foot piece 20. The tension of the spring 21 is stronger than the pressure exerted by the compression spring 10. The tension spring 21 could be replaced if desired by any resilient part and the compression spring 10 if desired by any resilient means provided, however, that the resilient part is stronger than the resilient means.

The operation of this device is as follows:

If the amputee swings the artificial leg, the foot piece 20 being lifted from the ground, the knee-joint is subjected to a first braking action between the element 1 and the lining 3 of the socket 2 forming the braking device of the knee-joint. The magnitude of the first braking action is adjustable by means of the screw nut 13 which when tightened draws the pivot 8 and the element 1 nearer to the socket 2. These elements form a first actuator for the braking device. If, however, the amputee stands on the heel portion 19 of the artificial leg and loads the same with his weight, the tension spring 21 is put under a tension so that a resiliency of the ankle joint is accomplished. Furthermore owing to the fact that the tension of the spring 21 is stronger than the pressure exerted by the compression spring 10 the tension spring overcomes the action of the compression spring so that the latter is compressed. These elements form a second actuation for the braking device and the action thereof is effected by the second connecting piece 15 which exerts a downward force on the first connecting piece 14 interconnecting the two actuators and pulling the rod 6 and the screw nut 9 connected thereto downward so that the spring 10 is compressed between the screw nut 9 and the bottom plate 11 of the sleeve 5. In consequence thereof, the pivot 8 approaches by a greater distance the sleeve 5, and the element 1 is strongly pressed against the lining 3 of the socket 2. If the front portion 29 of the foot piece 20 is loaded by the weight of the amputee the flexible member 16 connected to the heel portion 19 acts directly on the rod 6 and the pivot 8, the front portion of the foot piece acting thereby as a long lever arm of a lever brake or a second braking device formed by the members 16 and 17 and the parts connected thereto.

By changing the position of the nut 30 on the screw bolt 23, the position of the foot piece can be adjusted in the sense of a plantar or dorsal flexion. By changing the position of the nut 32 on the screw bolt 24 the tension of the tension spring 21 can be adjusted.

It should be noted that if the screw nut 9 is screwed down on the rod 6 so that the compression spring 10 is completely compressed at a correct adjustment of the braking action of the swinging phase by means of the screw nut 13, the lever brake is practically rendered ineffective since the pivot 8 and the element 1 cannot be pulled downward any more.

The screw nut 9 may be designed as a hexagonal nut with six side faces one of which is adjacent to the stop member 12 so than an adjustment of the screw nut 6 is only possible for one sixth of the pitch of the thread of the screw nut 9. A larger adjustment is effected by axially turning the rod 6 within the screw nut 9.

The adjustability of the distance of the element 1 and the socket 2 described hereinabove involves an inexpensive and easy readjustment of the knee-joint if the same has become worn. The fine adjustment afforded by the present invention is important because theoretically at the beginning and at the end of the supporting phase a slight mobility of the knee-joint is required without suggesting to the amputee a feeling of danger of a collapse.

Furthermore the arrangement of the parts described hereinabove involves the advantage that the center of gravity of the lower leg is situated in the uppermost third thereof similar to a natural leg. In consequence thereof such an arrangement is adapted to conserve the strength of the amputee in walking.

It will be understood that each of the elements described above, or two or more together, may also find a useful application in other types of artificial legs differing from the types described above.

While I have illustrated and described the invention as embodied in an artificial leg for thigh-amputees, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An artificial leg for thigh-amputees comprising in combination, a knee-joint; a braking device for said knee joint; a first actuator for said braking device; a second actuator for said braking device, said second actuator having a stronger action on said braking device than said first actuator; and a device for interconnecting said first actuator and said second actuator whereby by swinging the artificial leg about said knee-joint said first actuator acts on said braking device, and by loading the artificial leg by the weight applied to the heel or toe portion of the foot of the amputee, said second actuator acts on said braking device.

2. An artificial leg for thigh-amputees comprising in combination, a knee-joint; a braking device for said knee joint; a first actuator for said braking device; means for adjusting said first actuator; a second actuator for said braking device, said second actuator having a stronger action on said braking device than said first actuator device; means for adjusting said second actuator; and a device for interconnecting said first actuator and said second actuator whereby by swinging the artificial leg about said knee-joint said first actuator acts on said braking device and by loading the artificial leg by the weight applied to the heel or the portion of the foot of the amputee, said second actuator acts on said braking device.

3. An artificial leg for thigh-amputees comprising in combination, a knee-joint; a frictional braking device for said knee-joint, a first actuator for said braking device; a lever actuator for said braking device, said lever actuator having a stronger action on braking device than said first actuator; and a device for interconnecting said first actuator and said lever actuator, whereby by swinging the artificial leg about said knee-joint said first actuator acts on said braking device and by loading the artificial leg by the weight applied to the heel or toe portion of the foot of the amputee, said second actuator acts on said braking device.

4. An artificial leg for thigh-amputees comprising in combination, a knee-joint; a frictional braking device for said knee-joint; a first actuator for said braking device; means for adjusting said first actuator; a lever actuator for said braking device, said lever actuator having a stronger action on said braking device than said first actuator; means for adjusting said lever actuator; and a device for interconnecting said first actuator and said lever actuator whereby by swinging the artificial about said knee-joint said first actuator acts on said braking device and by loading the artificial leg by the weight applied to the heel or toe portion of the foot of the amputee, said second actuator acts on said braking device.

5. An artificial leg for thigh-amputees comprising in combination, a knee-joint; a frictional braking device for said knee-joint; a first actuator for said braking device, means including a first screw nut for adjusting said first actuator; a lever actuator for said braking device, said lever actuator having a stronger action on said braking device than said first actuator; means including a second screw nut for adjusting said lever actuator; and a device for interconnecting said first actuator and said second actuator whereby by swinging the artificial leg about said knee-joint said first actuator acts on said braking device and by loading the artificial leg by the weight applied to the heel or toe portion of the foot of the amputee, said second actuator acts on said braking device.

6. An artificial leg for thigh-amputees comprising in combination, a knee-joint including a substantially ball-shaped element and a socket having a surface cooperating with said ball-shaped element, said ball-shaped element and said socket having substantially conically shaped side surfaces allowing a movement of the artificial leg only in the sense of a flexion and an extension; a frictional braking device for said knee-joint including a lining arranged on the surface of said socket cooperating with said ball-shaped element; a first actuator for said braking device; a lever actuator for said braking device, said lever actuator having a stronger action on said braking device than said first actuator; and a device for interconnecting said first actuator and said lever actuator whereby by swinging the artificial leg about said knee-joint said first actuator acts on said braking device and by loading the artificial leg by the weight of the amputee applied to the heel or toe portion of the foot, said second actuator acts on said braking device.

7. An artificial leg for thigh-amputees comprising in combination, a knee-joint including a substantially ball-shaped element and a socket having a surface cooperating with said ball-shaped element, said ball-shaped element and said socket having substantially conically shaped side surfaces allowing a movement of the artificial leg only in the sense of a flexion and an extension; a frictional braking device for said knee-joint including a lining arranged on the surface of said socket cooperating with said ball-shaped element; a first actuator for said braking device; means including a first screw nut for adjusting said first actuator; a lever actuator for said braking device, said lever actuator having a stronger action on said braking device than said first actuator; means including a second screw nut for adjusting said lever actuator; and a device for interconnecting said first actuator and said lever actuator whereby by swinging the artificial leg about said knee-joint said first actuator acts on said braking device and by loading the artificial leg by the weight of the amputee applied to the heel or toe portion of the foot, said second actuator acts on said braking device.

8. An artificial leg for thigh-amputees comprising in combination, a knee-joint including a substantially ball-shaped element and a socket having a surface cooperating with said ball-shaped element, said ball-shaped element and said socket having substantially conically shaped side surfaces allowing a movement of the artificial leg only in the sense of a flexion and an extension; a frictional braking device for said knee-joint including a lining arranged on the surface of said socket cooperating with said ball-shaped element; a first actuator for said braking device; a lever actuator for said braking device, said lever actuator having a stronger action on said braking device than said first actuator; and a device for interconnecting said first actuator and said lever actuator, whereby by swinging the artificial leg about said knee-joint said first actuator acts on said braking device and by loading the artificial leg by the weight of the amputee applied to the heel or toe portion of the foot, said second actuator acts on said braking device, said interconnecting device including a sleeve extending through a boring of said socket, an adjustable rod connected with one end thereof to said knee-joint and extending through said sleeve, and means for resiliently connecting said rod to said sleeve.

9. An artificial leg for thigh-amputees comprising in combination, a knee-joint including a substantially ball-shaped element and a socket having a surface cooperating with said ball-shaped element, said ball-shaped element and said socket having substantially conically shaped side surfaces allowing a movement of the artificial leg only in the sense of a flexion and an extension; a frictional braking device for said knee-joint including a lining arranged on the surface of said socket cooperating with said ball-shaped element; a first actuator for said braking device; a lever actuator for said braking device, said lever actuator having a stronger action on said braking device than said first actuator; a device for interconnecting said first actuator and said lever actuator whereby by swinging the artificial leg about said knee-joint said first actuator acts on said braking device and by loading the artificial leg by the weight of the amputee applied to the heel or toe portion of the foot, said second actuator acts on said braking device, said interconnecting device including a sleeve extending through a boring of said socket, an adjustable rod connected with one end thereof to said knee-joint and extending through said sleeve, and means for resiliently connecting said rod to said sleeve; means including a first screw nut arranged on said rod outside said sleeve for adjusting said first actuator; and means including a second screw nut arranged on said rod inside said sleeve for adjusting said lever actuator.

10. An artificial leg for thigh-amputees comprising in combination, a knee-joint including a substantially ball-shaped element and a socket having a surface cooperating with said ball-shaped element, said ball-shaped element and said socket having substantially conically shaped side surfaces allowing a movement of the artificial leg only in the sense of a flexion and an extension; a frictional braking device for said knee-joint including a lining arranged on the surface of said socket cooperating with said ball-shaped element; a first acuator for said braking device; a lever actuator for said braking device, said lever actuator having a stronger action on said braking device than said first actuator; a device for interconnecting said first actuator and said lever actuator whereby by swinging the artificial leg about said knee-joint said first actuator acts on said braking device and by loading the artificial leg by the weight of the amputee applied to the heel or toe portion of the foot, said second actuator acts on said braking device, said interconnecting device including a sleeve extending through a boring of said socket, an adjustable rod connected with one end thereof to said knee-joint and extending through said sleeve, and means for resiliently connecting said rod to said sleeve; means including a first screw nut arranged on said rod outside said sleeve for adjusting said first actuator; and means including a second screw nut arranged on said rod inside said sleeve for adjusting said lever actuator, said means for resiliently connecting said rod to said sleeve being arranged on said rod between said first screw nut and said second screw nut.

11. An artificial leg for thigh-amputees comprising in combination, an element having an at least partly spherical surface; a socket having a surface cooperating with said spherical surface of said element, said element and said socket forming a knee-joint of the artificial leg; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a screw nut arranged on said rod and abutting against the lower surface of said bottom plate whereby by tightening said screw nut said pivot and said socket can be approached to each other and the friction between said element and said socket can be adjusted; a lever brake for said knee-joint, said lever brake being connected to said rod and having a stronger effect on said rod than the tightening effect of said screw nut on said rod; and means for actuating said lever brake when the artificial leg is loaded in the supporting phase by the weight of the amputee applied to the heel or toe portion of the foot.

12. An artificial leg for thigh-amputees comprising in combination, an element having an at least partly spherical surface; a socket having a surface cooperating with said spherical surface of said element, said element and said socket forming a knee-joint of the artificial leg; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; a lever brake for said knee-joint, said lever brake being connected to said rod and having a stronger effect on said rod than the tightening effect to said first screw nut on said rod; a second screw nut arranged on said rod; resilient means arranged between said second screw nut and the upper surface of said bottom plate, whereby by tightening said second screw nut said resilient means are put under an elastic strain and the effect of said lever brake is adjusted; and means for actuating said lever brake when the artificial leg is loaded in the supporting phase by the weight of the amputee applied to the heel or toe portion of the foot.

13. An artificial leg for thigh-amputees comprising in combination, an element having an at least partly spherical surface; a socket having a surface cooperating with said spherical surface of said element, said element and said socket forming a knee-joint of the artificial leg; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a lever brake for said knee-joint, including a first member connecting the lower end of said rod and said heel portion of said foot piece and a second member connecting said rod and the front portion of said foot piece, said second member including a resilient part; a second screw nut arranged on said rod; resilient means arranged between said second screw nut and the upper surface of said bottom plate, whereby by tightening said second screw nut said resilient means are put under an elastic strain and the effect of said lever brake is adjusted, said resilient part being stronger than said resilient means; and means for actuating said lever brake when the artificial leg is loaded in the supporting phase by the weight of the amputee applied to the heel or toe portion of the foot.

14. An artificial leg for thigh-amputees comprising in combination, an element having an at least partly spherical surface; a socket having a surface cooperating with said spherical surface of said element, said element and said socket forming a knee-joint of the artificial leg; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a lever brake for said knee-joint, including a first member connecting the lower end of said rod and said heel portion of said foot piece and a second member connecting said rod and the front portion of said foot piece, said second member including a resilient part; a second screw nut arranged on said rod inside said sleeve and having a polygonal perimeter including consecutive corners; a projection arranged on the inner face of said sleeve and extending into the path of the corners of the perimeter of said second screw nut so as to permit a turning of said second screw nut amounting to less than an angle included by two consecutive corners of the perimeter of said second screw nut; resilient means arranged between said second screw nut and the upper surface of said bottom plate, whereby by tightening said second screw nut said resilient means are put under an elastic strain and the effect of said lever brake is adjusted, said resilient part being stronger than said resilient means; and means for actuating said lever brake when the artificial leg is loaded in the supporting phase by the weight of the amputee applied to the heel or toe portion of the foot.

15. An artificial leg for thigh-amputees comprising in combination, an element having an at least partly spherical surface; a socket having a surface cooperating with said spherical surface of said element, said element and said socket forming a knee-joint of the artificial leg; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot.

16. An artificial leg for thigh-amputees comprising in combination, an element having an at least partly spherical surface; a socket having a surface cooperating with said spherical surface of said element, said element and said socket forming a knee-joint of the artificial leg; a lining arranged on the surface of said socket cooperating with said spherical surface of said element; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; and extension rigidly connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot.

17. An artificial leg for thigh-amputees comprising in combination, an element having an at least partly spherical surface; a socket having a surface cooperating with said spherical surface of said element, said element and said socket forming a knee-joint of the artificial leg; a lining arranged on the surface of said socket cooperating with said spherical surface of said element; conically shaped side surfaces arranged on said element and said socket and being in contact with one another, respectively, so as to allow a movement of the artificial leg only in the sense of a flexion and an extension; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot.

18. An artificial leg for thigh-amputees comprising in combination, an element having an at least partly spherical surface; a socket having a surface cooperating with said spherical surface of said element, said element and said socket forming a knee-joint of the artificial leg; a lining arranged on the surface of said socket cooperating with said spherical surface of said element; conically shaped side surfaces arranged on said element and said socket and being in contact with one another, respectively, so as to allow a movement of the artificial leg only in the sense of a flexion and an extension; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring so as to compress said compression spring when said tension spring is extended at a stepping of the amputee on said heel portion of the artificial leg, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot.

19. An artificial leg for thigh-amputees comprising in combination, an element having an at least partly spherical surface; a socket having a surface cooperating with said spherical surface of said element, said element and said socket forming a knee-joint of the artificial leg; a lining arranged on the surface of said socket cooperating with said spherical surface of said element; conically shaped side surfaces arranged on said element and said socket and being in contact with one another, respectively, so as to allow a movement of the artificial leg only in the sense of a flexion and an extension; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidly connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring so as to compress said compression spring and to press said element strongly against said lining arranged on said socket when said tension spring is extended at a stepping of the amputee on said heel portion of the artificial leg, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot.

20. An artificial leg for thigh-amputees comprising in combination, an element having an at least partly spherical surface; a socket having a surface cooperating with said spherical surface of said element, said element and said socket forming a knee-joint of the artificial leg; a lining arranged on the surface of said socket cooperating with said spherical surface of said element; conically shaped side surface arranged on said element and said socket and being in contact with one another, respectively, so as to allow a movement of the artificial leg only in the sense of a flexion and an extension; a pivot arranged substantially in a horizontal diameter of said spherical surface of said element; a sleeve arranged radially to said spherical surface in a boring of said socket; a bottom plate forming part of said sleeve and having an aperture; a rod connected with one end thereof to said pivot and extending through said sleeve and beyond the aperture of said bottom plate; a first screw nut arranged on said rod and abutting against the lower surface of said bottom plate whereby by tightening said first screw nut said pivot and said socket can be approached to each other and the friction between said element and said socket can be adjusted; an extension rigidily connected to, and reaching substantially vertically downward from, said socket; a foot piece pivotally connected to the lower end of said extension and including a heel portion and a front portion located at opposite sides of the pivotal connection of said extension and said foot piece; a first connecting piece connected with one end thereof to said rod; a first flexible member connecting the other end of said first connecting piece to said heel portion of said foot piece; a second connecting piece connected with one end thereof to said rod; a tension spring connected with one end thereof to the other end of said second connecting piece; a second flexible member connecting the other end of said tension spring to said front portion of said foot piece; a second screw nut arranged on said rod; and a compression spring arranged between said second screw nut and the upper surface of said bottom plate, whereby by tightening said second screw nut said compression spring is compressed, said tension spring being stronger than said compression spring so as to compress said compression spring and to press said element strongly against said lining arranged on said socket when said tension spring is extended at a stepping of the amputee on said heel portion of the artificial leg, whereby said knee-joint is subjected to a first braking effect between said element and said socket when the artificial leg is swung by the amputee and is subjected to a second braking effect being larger than the first braking effect when the amputee stands on the artificial leg and loads the same by his weight applied to the heel or toe portion of the foot, said compression spring rendering ineffective at the beginning of a swinging phase of the artificial leg any adhesion between said element and said lining caused by the action of said second member and said tension spring.

ERICH FEINE.

REFERENCES CITED

The following references are of record in the file of this patent:

UNITED STATES PATENTS

| Number | Name | Date |
| --- | --- | --- |
| 2,400,032 | Tabot | May 7, 1946 |
| 2,450,728 | Havens | Oct. 5, 1948 |

FOREIGN PATENTS

| Number | Country | Date |
| --- | --- | --- |
| 158,096 | Great Britain | Jan. 31, 1921 |